United States Patent
Nama et al.

(10) Patent No.: US 9,516,600 B1
(45) Date of Patent: Dec. 6, 2016

(54) CLOSED-LOOP DOWNLINK TRANSMIT POWER ASSIGNMENTS IN A SMALL CELL RADIO ACCESS NETWORK

(71) Applicant: SpiderCloud Wireless, Inc., San Jose, CA (US)

(72) Inventors: Hithesh Nama, San Jose, CA (US); Lili Zhang, San Carlos, CA (US); Cong Shen, New York, NY (US); Peter J. Worters, San Carlos, CA (US)

(73) Assignee: SPIDERCLOUD WIRELESS, INC., Milpitas, CA (US)

( * ) Notice: Subject to any disclaimer, the term of this patent is extended or adjusted under 35 U.S.C. 154(b) by 0 days.

(21) Appl. No.: 15/043,691

(22) Filed: Feb. 15, 2016

(51) Int. Cl.
*H04W 36/00* (2009.01)
*H04W 52/14* (2009.01)
*H04W 52/24* (2009.01)
*H04W 36/04* (2009.01)

(52) U.S. Cl.
CPC ........... *H04W 52/143* (2013.01); *H04W 36/04* (2013.01); *H04W 52/245* (2013.01)

(58) Field of Classification Search
CPC ... H04W 52/143; H04W 36/04; H04W 52/245
USPC ............... 455/404.1, 418–422.1, 435.3–453, 509,455/522, 456.1, 550.1, 561, 67.11; 370/328–332, 341
See application file for complete search history.

(56) References Cited

U.S. PATENT DOCUMENTS

| | | | |
|---|---|---|---|
| 7,499,718 B2 * | 3/2009 | Stephenson | H04W 24/00 455/423 |
| 7,865,132 B2 * | 1/2011 | Mitchell | H04W 52/146 455/1 |
| 8,095,170 B2 * | 1/2012 | Lopes | H04W 16/10 455/435.2 |
| 8,711,705 B1 * | 4/2014 | Johnson | H04L 41/5009 370/241 |
| 9,131,403 B1 * | 9/2015 | Courchesne | H04W 16/225 |
| 2004/0092262 A1 * | 5/2004 | Voyer | H04W 36/30 455/435.2 |
| 2005/0003823 A1 * | 1/2005 | Kim | H04W 16/18 455/446 |
| 2005/0255870 A1 * | 11/2005 | Chang | H04W 76/028 455/502 |
| 2010/0039948 A1 * | 2/2010 | Agrawal | H04W 72/082 370/252 |
| 2013/0005385 A1 * | 1/2013 | Hunukumbure | H04W 16/22 455/517 |

(Continued)

*Primary Examiner* — Babar Sarwar
(74) *Attorney, Agent, or Firm* — Stuart H. Mayer; Mayer & Williams PC

(57) ABSTRACT

A method for assigning downlink transmit power levels to radio nodes (RNs) in a small cell radio access network (RAN) includes assigning initial power levels to the RNs. For each cell, first events are counted indicating that UEs receiving a signal from their serving cells with a signal strength below a specified value have entered a coverage hole. For each cell, second events are counted indicating that UEs have re-established a previous connection on one of the cells. For each pair of cells, a coverage hole is identified between them if the number of first events for one cell exceeds a threshold and a number of second events or re-establishment of a previous connection on the other cell exceeds another threshold. For each identified coverage hole, the downlink transmit power level is increased of at least one RN in the pair of cells between which the coverage hole is identified.

21 Claims, 6 Drawing Sheets

(56) References Cited

U.S. PATENT DOCUMENTS

| | | | |
|---|---|---|---|
| 2013/0194276 A1* | 8/2013 | Sato | H04W 16/20 345/440 |
| 2013/0262656 A1 | 10/2013 | Cao et al. | |
| 2015/0119063 A1* | 4/2015 | Yu | H04W 52/38 455/452.2 |

* cited by examiner

CLOSED-LOOP DOWNLINK TRANSMIT POWER ASSIGNMENTS IN A SMALL CELL RADIO ACCESS NETWORK

BACKGROUND

Operators of mobile systems, such as universal mobile telecommunications systems (UMTS) and its offspring including LTE (long term evolution) and LTE-advanced, are increasingly relying on wireless small cell radio access networks (RANs) in order to deploy indoor voice and data services to enterprises and other customers. Such small cell RANs typically utilize multiple-access technologies capable of supporting communications with multiple users using radio frequency (RF) signals and sharing available system resources such as bandwidth and transmit power.

Planning a deployment of radio cells is a complex task, which requires taking into consideration a variety of parameters. The planning is particularly difficult for the deployment of radio cells inside a building. For instance, the parameters that typically need to be taken into consideration include: a particular layout of the building, propagation and absorption characteristics of the building, specific radio interface(s) supported by the radio cells, specific characteristics of the radio cells, interferences between radio cells, etc. To obtain an optimal coverage, the deployed radio cells need to be positioned close enough to each other, while at the same time minimizing interference between them. Also, the position of each radio cell should be selected judiciously to minimize the total number of radio cells required to obtain optimal coverage.

SUMMARY

In accordance with one aspect of the subject matter disclosed herein, a method is shown for assigning downlink transmit power levels to a plurality of radio nodes (RNs) in a radio access network (RAN) deployed in a defined environment. In accordance with the method, initial power levels are assigned to each of the RNs in the deployed RAN. For each cell associated with the RNs, a number of first events are counted, which indicate that UEs receiving a signal from their serving cells with a signal strength below a specified value have entered a coverage hole. For each cell associated with the RNs, a number of second events is counted, which indicates that the UEs have re-established a previous connection on one of the cells. For each pair of cells i and j in the RAN, a coverage hole is identified between a cell i and a cell j in the RAN if a number of first events counted for cell i exceeds a threshold level and a number of second events counted for re-establishment of a previous connection on cell j from a disconnect on cell i exceeds another threshold level. For each of the identified coverage holes, the downlink transmit power level is increased of at least one of the RNs associated with the pair of cells between which the coverage hole has been identified.

In accordance with another aspect of the subject matter disclosed herein, a method is shown for assigning downlink transmit power levels to a plurality of radio nodes (RNs) in a RAN deployed in a defined environment. In accordance with the method, initial power levels are assigned to each of the RNs in the deployed RAN. Transfer requests are received from a macro network each requesting a hand-in of a UE from the macro network to one of the cells. Each of the transfer requests includes UE history information for the UE being handed-in. For any pair of cells in the RAN, an inference is made that a coverage hole exists between the pair of cells if the UE history information received by one of the cells in the pair for a given UE indicates that the given UE was connected to the other cell in the pair prior to the transfer of the given UE to the macro cell. A number of received transfer requests is counted from which the existence of a coverage hole is inferred between each pair of cells in the RAN and, if the number for a particular pair exceeds a threshold value, the downlink transmit power is adjusted upward of at least one of the RNs associated with the cells in the pair.

In accordance with yet another aspect of the subject matter disclosed herein, a method is shown for assigning downlink transmit power levels to a plurality of radio nodes (RNs) in a small cell RAN or pico network deployed in a defined environment. In accordance with the method, initial power levels are assigned to each of the RNs in the deployed small cell RAN or pico network. A transfer request is received from a macro network requesting a hand-in of a UE from a macro network to one of the cells in the small cell RAN or pico network. A hand-out from one of the cells in the small cell RAN or pico network to the macro network is identified for a hand-in session of the UE. An event is identified that starts at a time of the hand-in request from the macro network and ends at a time when the hand-out of the UE to the macro network is identified. The event is counted as arising from leakage of downlink transmission power from the cell where the hand-in occurred to a region outside of the defined environment if a duration of the event is less than a threshold amount of time. The downlink transmission power assigned to the cell where the hand-in occurred is reduced if the number of events counted for the cell during a specified time period exceeds a threshold value.

In accordance with yet another aspect of the subject matter disclosed herein a method is shown for assigning downlink transmit power levels to a plurality of radio nodes (RNs) in a RAN deployed in a defined environment. In accordance with the method, initial power levels are assigned to each of the RNs in the deployed ran. Transfer requests are received from a macro network each requesting a hand-in of a UE from the macro network to one of the cells. Each of the transfer requests includes UE history information for the UE being handed-in. For any pair of cells in the RAN, a number of events is counted that arise between the pair of cells when the UE history information received by one of the cells in the pair for a given UE indicates that the given UE was connected to the other cell in the pair prior to the transfer of the given UE to the macro cell. If the number of events for a particular pair is below a threshold value, the downlink transmit power of at least one of the RNs associated with the cells in the pair is adjusted downward.

DETAILED DESCRIPTION

Figure 1:
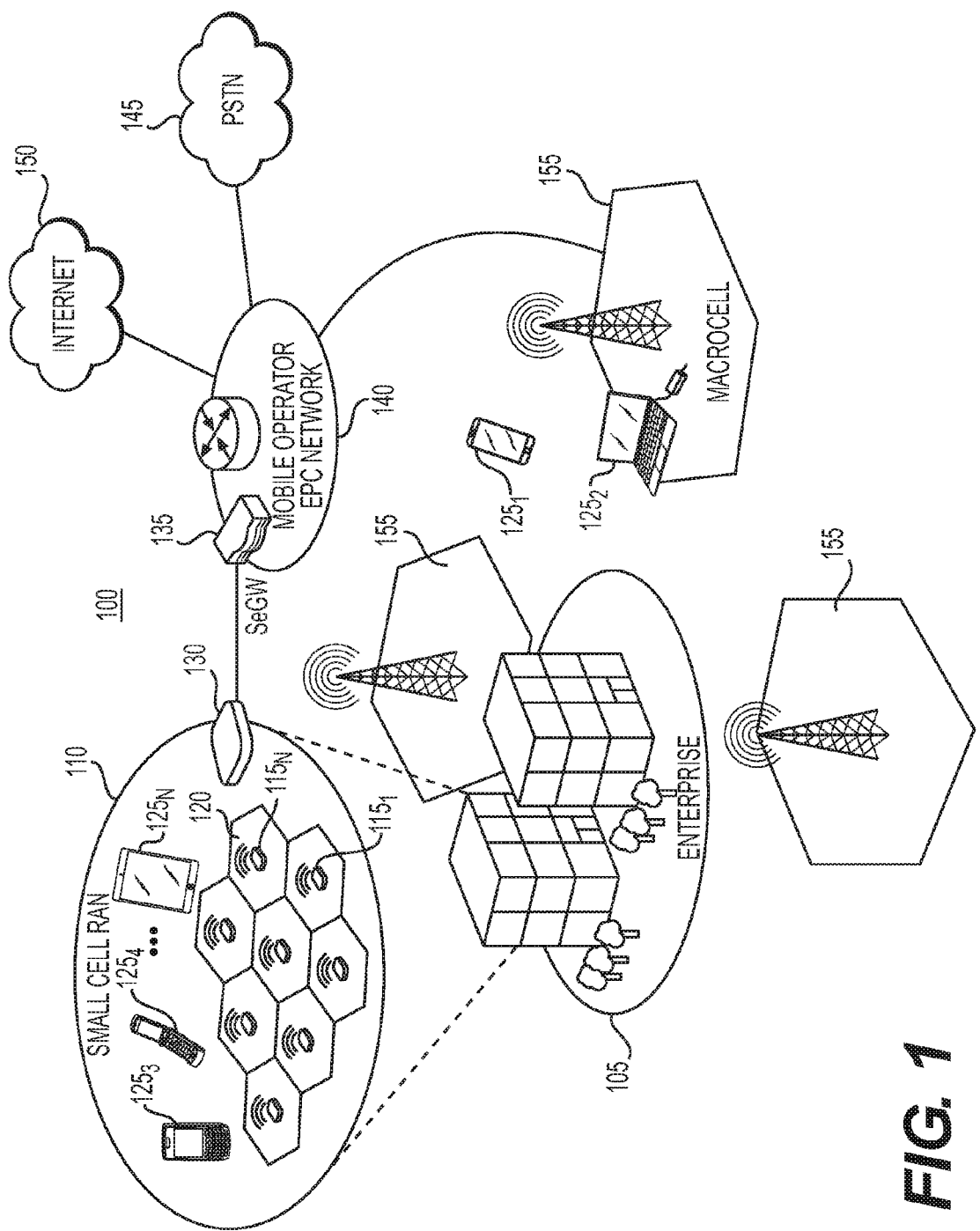
FIG. 1 shows an illustrative mobile telecommunications environment may be practiced.

FIG. 1 shows an illustrative mobile telecommunications environment 100 in which the present invention may be practiced. The mobile telecommunications environment 100, in this illustrative example, is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the present principles described herein may also be applicable to other network types and protocols. For example, other network types and protocols that may be employed include, without limitation HSPA, LTE, CDMA2000, GSM, etc. or a mixture of technologies such as with a multi-standard radio (MSR) node (e.g., LTE/HSPA, GSM/HS/LTE, CDMA2000/LTE, etc).

The environment 100 includes an enterprise 105 in which a small cell RAN 110 is implemented. The small cell RAN 110 includes a plurality of radio nodes (RNs) $115_1 \ldots 115_N$. Each radio node 115 has a radio coverage area (graphically depicted in the drawings as a hexagonal shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals $125_1$-$125_N$ in FIG. 1). However, the foregoing is intended to be illustrative and the solutions described herein can be typically expected to be readily scalable either upwards or downwards as the needs of a particular usage scenario demand.

In this particular illustrative example, the small cell RAN 110 includes one or more access controllers (represented as a single access controller 130 in FIG. 1) that manage and control the radio nodes 115. In alternative implementations, the management and control functionality may be incorporated into a radio node, distributed among nodes, or implemented remotely (i.e., using infrastructure external to the small cell RAN 110). The radio nodes 115 are coupled to the services node 130 over a direct or local area network (LAN) connection (not shown in FIG. 1) typically using secure IPsec tunnels. The access controller 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

One example of an access controller that may be employed is the Spidercloud Services Node, available from Spidercloud Wireless, Inc. In the following examples the access controller will generally be illustrated using the Spidercloud Services Node. More generally, however, in all cases any suitable access controller may be employed.

The environment 100 also generally includes Evolved Node B (eNB) base stations, or "macrocells", as representatively indicated by reference numeral 155 in FIG. 1. The radio coverage area of the macrocells 155 is typically much larger than that of a small cell where the extent of coverage often depends on the base station configuration and surrounding geography. As shown in FIG. 1, in this example the coverage area of one of the macrocells 155 overlaps with the enterprise 105. Thus, a given UE 125 may achieve connectivity to the network 140 through either a macrocell or small cell in the environment 100.

Figure 2:
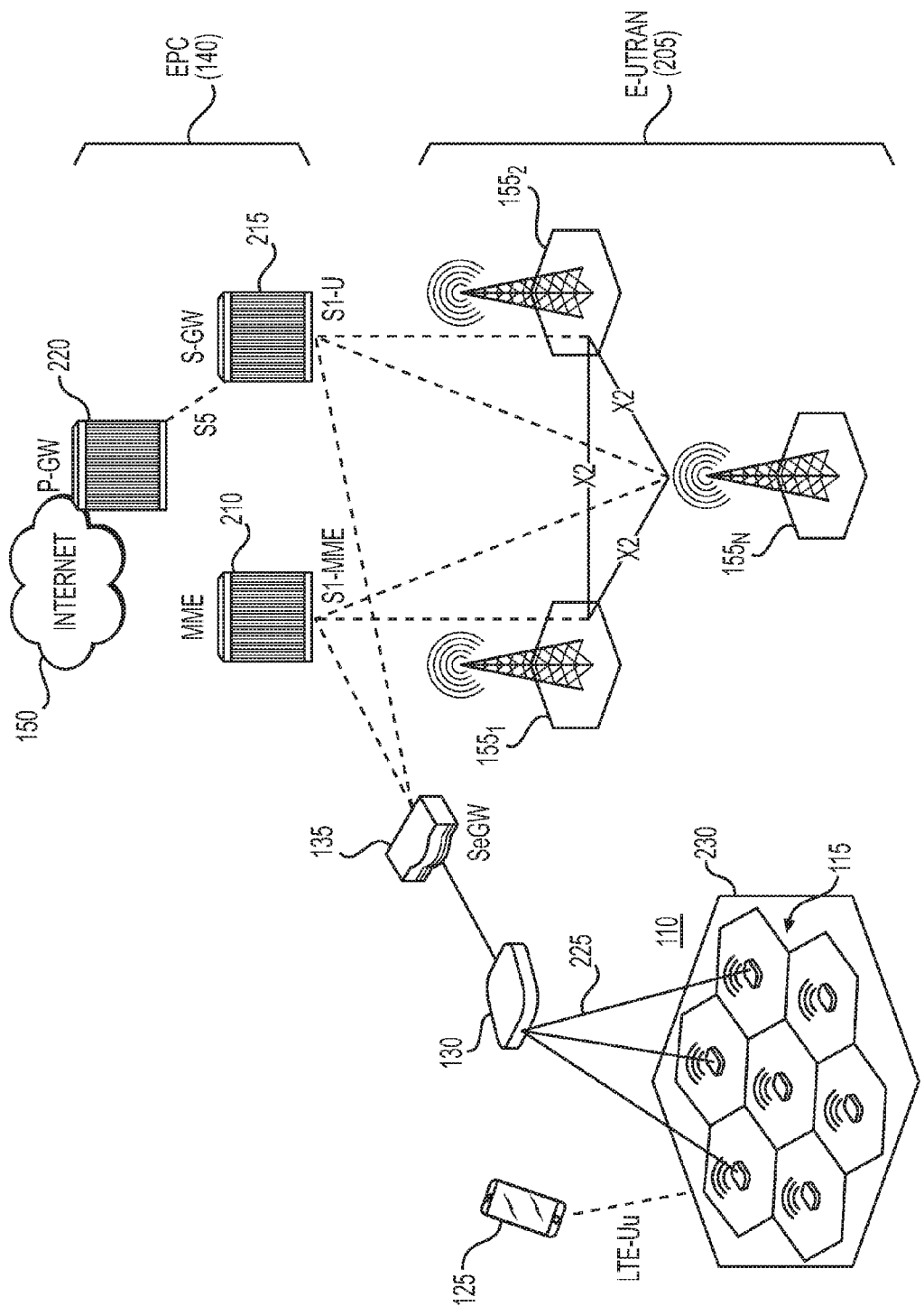
FIG. 2 shows details of an EPC (Evolved Packet Core) and E_UTRAN (Evolved UMTS Terrestrial Radio Access Network where UMTS is an acronym for Universal Mobile Telecommunications System) arranged under LTE (Long Term Evolution) with which a small cell network may interoperate.

Along with macrocells 155, the small cell RAN 110 forms an access network, i.e., an Evolved UMTS Terrestrial Radio Access Network (E-UTRAN) under 3GPP as represented by reference numeral 205 in FIG. 2. As shown, there is no centralized controller in the E-UTRAN 205, hence an LTE network architecture is commonly said to be "flat." The macrocells 155 are typically interconnected using an X2 interface and to the EPC 140 by means of an S1 interface. More particularly, the macrocells are connected to the MME (Mobility Management Entity) 210 in the EPC 140 using an S1-MME interface and to the S-GW (Serving Gateway) 215 using an S1-U interface. An S5 interface couples the S-GW 215 to a P-GW (Packet Data Network Gateway) 220 in the EPC 140 to provide the UE 125 with connectivity to the Internet 150. A UE 125 connects to the radio nodes 115 over an LTE-Uu interface.

The SeGW 135 is also connected to the MME 210 and S-GW 215 in the EPC 140 using the appropriate S1 connections. Accordingly, as each of radio nodes 115 in the small cell RAN 110 is operatively coupled to the services node 130 (as representatively shown by lines 225), the connections from the radio nodes 115 to the EPC 140 are aggregated to the EPC 140. Such aggregation preserves the flat characteristics of the LTE network while reducing the number of S1 connections that would otherwise be presented to the EPC 140. The small cell RAN 110 thus essentially appears a single eNB 230 to the EPC 140, as shown.

The LTE air interface uses Orthogonal Frequency Division Multiplexing (OFDM) for enhanced throughput and spectral efficiency. The air interface has a transmission time interval of 1 msec along with other features to lower latency. The primary element used in scheduling transmissions is a "resource block" (RB), and resource blocks make up frames and subframes, which in turn include both control regions and data regions.

Figure 3:
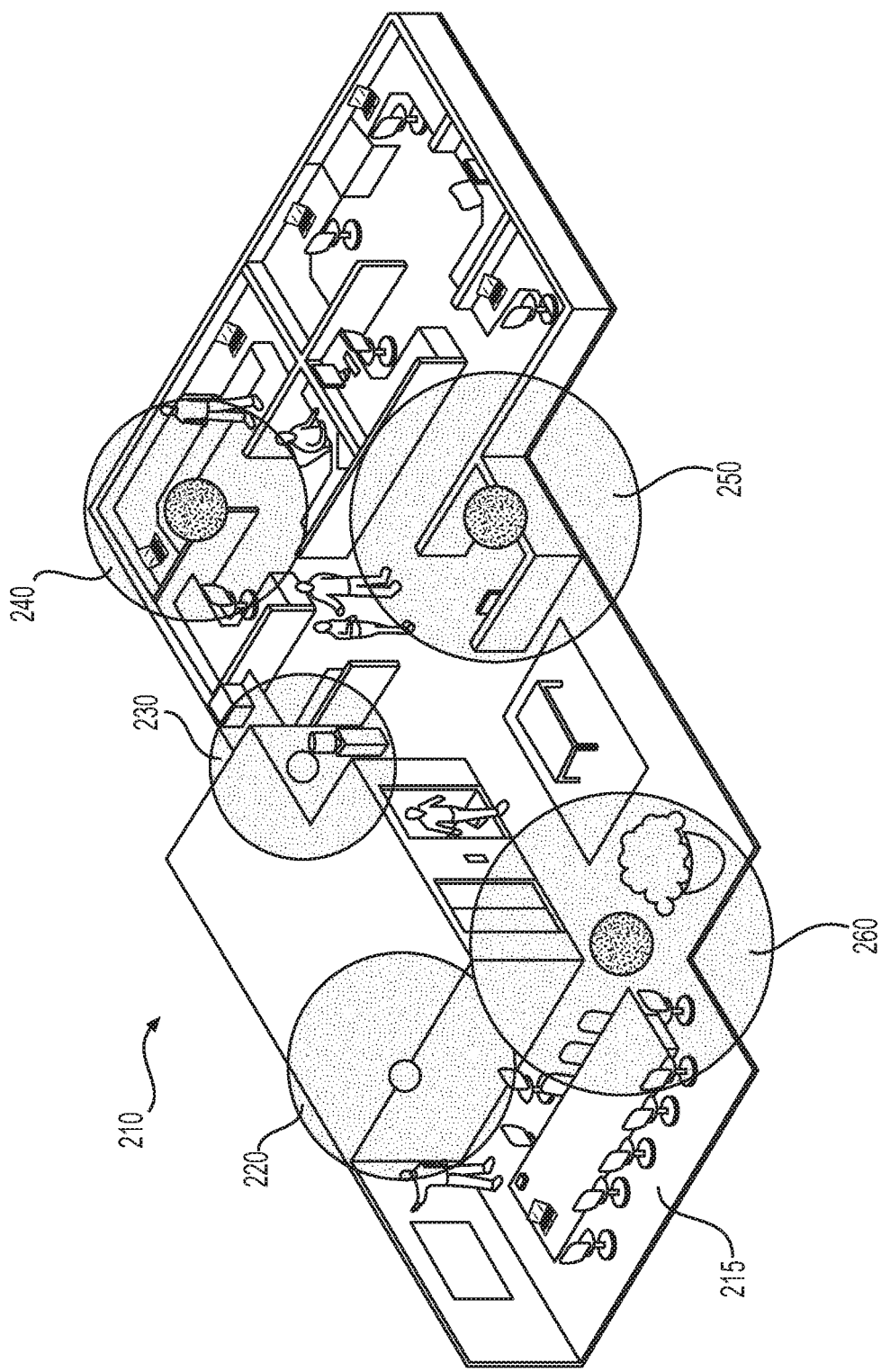
FIG. 3 shows an exemplary deployment of a radio node (RN) in a building.

Referring now to FIG. 3, an exemplary deployment of RNs in a building is represented. Of course, more generally the small cells may be located indoors, outdoors or partially indoors and partically outdoors. The building comprises a floor 210, where a plurality of RNs (not represented in FIG. 1) have been deployed, each RN providing downlink radio coverage as represented by the coverage areas 220, 230, 240, 250 and 260 of the RF propagation transmitted by each RN. The RNs are positioned to cover areas of the floor where communications via the RNs need to be supported. For example, a conference room 215 is covered by two RNs providing the radio coverage areas 220 and 260. Furthermore, an optimal position for each RN is determined, to reduce radio interference between RNs and maximize radio coverage as shown by coverage areas 220, 230, 240, 250 and 260. The coverage areas 220, 230, 240, 250 and 260 are represented as circles with different radii. Although shown as circles, those skilled in the art will understand that circles are used for exemplary purposes, and the shape of the coverage areas of each RN cell depends on the type of antenna being used by each RN. The radius of each circle corresponds to a calculated RF propagation transmitted by RN and depends, among other things, on the transmission power of the RN and the environment in which it is used.

The deployment of a small cell RAN in an enterprise is a largely manual process where a series of tasks such as site preparation, site acquisition, site selection, network design are performed. Network design involves deciding how many RNs are needed and identifying locations for their placement. Proprietary RF simulation tools may be used during this process to determine the expected signal strength at all locations within the enterprise. Inputs to this design process include site parameters, RN parameters and one or more design criteria. The site parameters includes parameters such as the floor plan, building materials and any interference that might arise from any macro cells that may overlap with the enterprise. The RN parameters includes parameters such as the maximum transmit powers of the RNs, the antenna radiation patterns and the small cell load factor, which specifies the amount of time a cell is expected to be transmitting. The design criteria may be specified in terms of a desired reference signal received power (RSRP) and/or a signal to interference-plus-noise ratio (SINR). For example, the design criteria may specify that the small cell RAN should provide better than −95 dBm RSRP over more than 95% of the enterprise.

As part of the design process, the RNs are generally assumed to transmit at something less than their maximum transmit powers in order to allow some room for inaccuracies in the design model of the enterprise. Accordingly, the downlink transmit powers of the deployment are overprovisioned by say, 3 or 4 db of margin to account for such inaccuracies as well as unknown and variable parameters. Thus, if, for example, the RNs are able to transmit 125 milliwatts for each of 2 antennas, the RN may be assumed to transmit about 30 milliwatts for purposes of site design.

The output from the design process includes the number and locations of the RNs needed to cover the enterprise and a coverage map that shows the RSRP and the SINR across the enterprise. The small cell RAN may be installed in accordance with this design model output from the design process.

Generally there will be coverage holes that are identified after the installation of the small cell RAN. As part of the process to reduce and eliminate these coverage holes, radio environment monitoring (REM) scans are often performed after system installation, typically under the control of the services node 130, which is used to coordinate the scans. During each scan, one RN in the small cell RAN transmits at its maximum power and all the other RNs determine the power received from that transmitting RN. This process is repeated until every RN has scanned every other RN. The results of these measurements provide the transmitted and received powers between each pair of RNs in the small cell RAN. Since based on these measurements the transmitted and received powers are known, the path loss between any two RNs can be determined. Using the path loss measurements, an algorithm can be developed to adjust the transmit powers of the RNs to better achieve the design criteria and eliminate the coverage holes.

Despite the use of REM scans to improve the coverage of a newly installed small cell RAN, a number of limitations remain. For instance, the results may not be very robust or reliable. Also, a neighboring RAN or a macrocell may prevent some REM scans from being performed. Moreover, the REM measurements are made at the center of a cell (i.e., at the site of the RN) and thus may not capture actual interference that may be experienced by UEs. Another problem is that leakage or bleedout of the downlink power outside of the designated area of coverage, which may cause unwanted interference with UEs on other networks, is not even addressed by the use of REM scans.

In accordance with one aspect of the subject matter disclosed herein, methods and systems are provided which address the aforementioned problems that arise when performing the the RN downlink transmit power assignments of the RNs in a small cell RAN after the initial system deployment. These methods and systems may also be periodically performed after the system is deployed in order to account for non-static unknown problem that may arise such as macro-cell interference or changes in the environment surrounding the enterprise (e.g. installation of another small cell RAN in a neighboring building).

Figure 4:
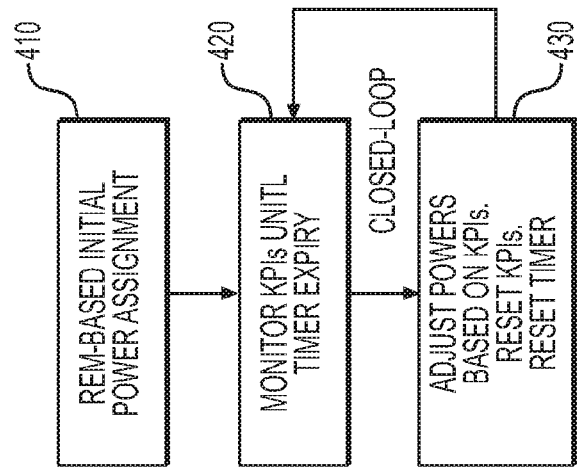
FIG. 4 is a flowchart illustrating at a high level a closed-loop power assignment process.

FIG. 4 is flowchart illustrating at a high level a closed-loop power assignment process that may be employed. At step 410, an initial REM-based power assignment process is performed as described above. Next, in step 420, various performance parameters (e.g., key performance indicators (KPI)) and other system parameters are monitored until the expiration of a timer. Finally, in step 430 the downlink transmit power assignments of the RNs are adjusted as necessary to improve the performance parameters, after which the timer is reset and the monitoring step 420 is repeated.

The methods and systems described herein will be discussed in more detail for three different illustrative use cases. In the first use case, there is no overlapping macro cell network that is present in the area where the small cell RAN is installed. In the second use case, there is an overlapping macro cell network present that provides coverage to UEs in the area where the small cell RAN is installed. Finally, the third illustrative use case addresses the problem of bleedout or leakage of the RN downlink transmit power to areas adjacent to but outside of the enterprise's coverage area.

Some of the methods and systems described herein make use of information received by the RNs from UEs in response to a triggering event. Such triggering events are defined for Long Term Evolution (LTE) cellular networks. In LTE networks, when a UE receives RF signals from the serving cell RN and potential RNs to which the UE may be handed off, the UE may report signal measurements, as received by the UE, to the UE's serving cell RN using a Radio Resource Control (RRC) Measurement Report. There are multiple HO-triggering or Measurement Report-triggering events (generally referred to herein as a triggering event) defined for an LTE cellular network. When the criteria or conditions defined for a triggering event are satisfied, the UE will generate and send a Measurement Report to its serving cell RN. Currently, there are eight different triggering events defined for E-UTRAN in section 5.5.4 of the 3GPP Technical Specification (TS) 36.331, version 12.2.0 (June 2014), titled "$3^{rd}$ Generation Partnership Project; Technical Specification Group Radio Access Network; Evolved Universal Terrestrial Radio Access (E-UTRA); Radio Resource Control (RRC); Protocol specification (Release 12)." Each of these eight triggering events has different triggering conditions. The discussion herein primarily focuses on the Event A2, which refers to a situation in which the RSRP of the power received by the UE from the serving cell RN falls below falls below some predefined threshold.

Figure 5:
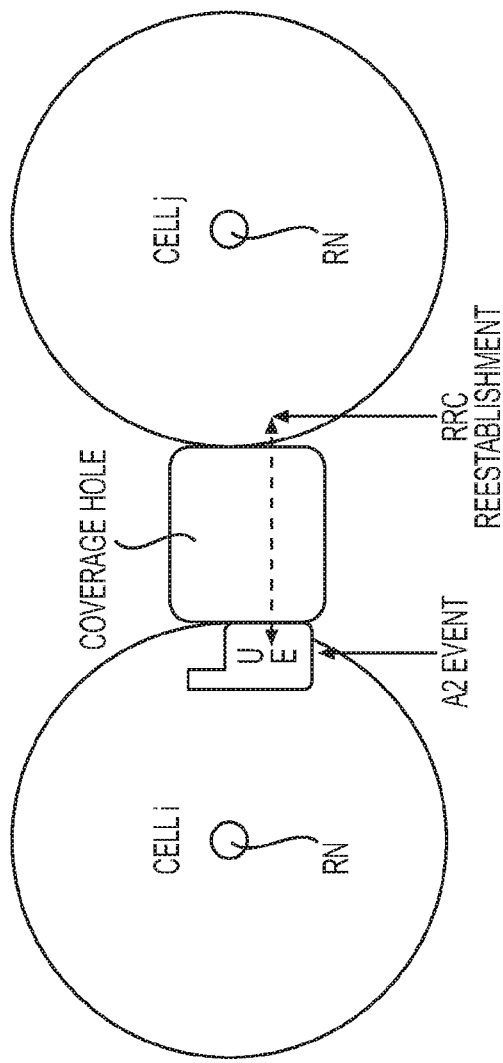
FIG. 5 shows a simplified floorplan that includes adjacent cells i and j that have a coverage hole between their respective coverage areas without an overlapping macrocell.

The first use case, in which there is no overlapping macro cell network that is present in the area where the small cell RAN is installed, will be illustrated with reference to FIG. 5. It should be noted the techniques employed in this first illustrative use case are not limited to a small cell RAN. More generally, these techniques also may be applied to a macrocell network. Moreover, these techniques may even be applied to heterogenous networks ("Hetnets") that include a combination of small cells and macrocells. FIG. 5 shows adjacent cells i and j that have a coverage hole 510 between their respective coverage areas. As previously mentioned, cells i and j may be small cells or macrocells. As part of the downlink transmit power assignment process, the UE is configured to generate a Measurement Report upon the occurrence of an A2 event, which indicates that the UE has entered a coverage hole. Included in the Measurement Report reporting the A2 event is the identity of the serving cell and possibly the identity of other cells from which the UE receives power, generally at much lower levels.

When the UE enters the coverage area of the cell j the UE is also configured to generate an RRC Connection Reestablishment Request that is sent to the RN of cell j. The RRC Connection Reestablishment Request is a message defined by the RRC protocol that requests reestablishment of a previous connection. Included in the RRC Connection Reestablishment Request is the identity of the cell to which the UE was previous connected (e.g., cell i). In this way the receiving RN knows that a coverage hole may exist between cell i and cell j.

In accordance with the LTE standard, RNs generally include event counters that are used to aggregate radio network information such as handoff events, paging events, physical transmission powers and the like. In the present arrangement, one such counter in each RN may be configured to tally the number of A2 events received from UEs and another counter in each RN may be used to tally the number of RRC Connection Reestablishment Requests received from UEs. It should be noted that the counters does not necessarily contain a single number specifying the number of A2 events or RRC Connection Reestablishment Requests that received. Rather, the counters may maintain a vector having multiple entries. For instance, the counter that tallies A2 events may include a vector that tallies both the serving cell whose power has fallen below the predefined threshold and one or more other cells that the UE may report as neighbor cells when the A2 event occurs. If an A2 event does not happen to include information for any neighboring cells, then a default entry is updated that is not associated with any neighbor. Likewise, the counter that tallies RRC Connection Reestablishment Requests includes a vector that tallies both the cell to which the UE is being reattached and the cell to which it was previously attached.

A coverage hole may be identified between a qualified pair of cells i and j if the A2 event counter for cell i and the corresponding RRC Connection Reestablishment Request counter for re-establishment of a connection on cell j from a disconnect on cell i are above some predefined threshold. That is, while a coverage hole may exist between a pair of cells i and j when the corresponding counters simply report a single A2 event for cell i and a single RRC Connection Reestablishment Request on cell j from a disconnect on cell i, a more accurate and reliable coverage map of the enterprise generally will be produced by waiting until more such counts are received before taking action (e.g., adjusting the RN downlink transmit power assignments) to eliminate the coverage hole.

In some implementations, instead of identifying a coverage hole when the number of events tallied by the A2 event counter exceeds some predefined number of events, a normalized number of events may be used to identify a coverage hole. In particular, in this embodiment a coverage hole is identified when the number of events identified between a qualified pair of cells i and j if the A2 event counter for cell i and the corresponding RRC Connection Reestablishment Request counter for re-establishment of a connection on cell j from a disconnect on cell i relative to the total number of handovers to cell j exceeds some relative threshold (i.e., a percentage). Once a coverage hole has been identified the downlink transmission power assignments of the RNs associated with the qualified pairs of cells between which the coverage hole is located may be adjusted in any appropriate manner to reduce or eliminate the hole. For instance, in one simple approach, the power assignment of the RN associated with each cell that appears in a qualified pair may be increased by some amount. Of course, other techniques for adjusting the downlink transmission power assignments may be employed as well.

In some implementations instead of increasing the downlink power assignments to the RNs, it may be appropriate to reduce the power to certain RNs if the values of A2 event counter and of the RRC Connection Reestablishment Request counter indicate that the call disconnects due to poor coverage relative to the total numbers of handovers is below some predefined configurable threshold. A value for the counter below this threshold would indicate that the transmit powers are higher than necessary to ensure that the handover success rate is above a desired percentage e.g. 99.5%.

Figure 6:
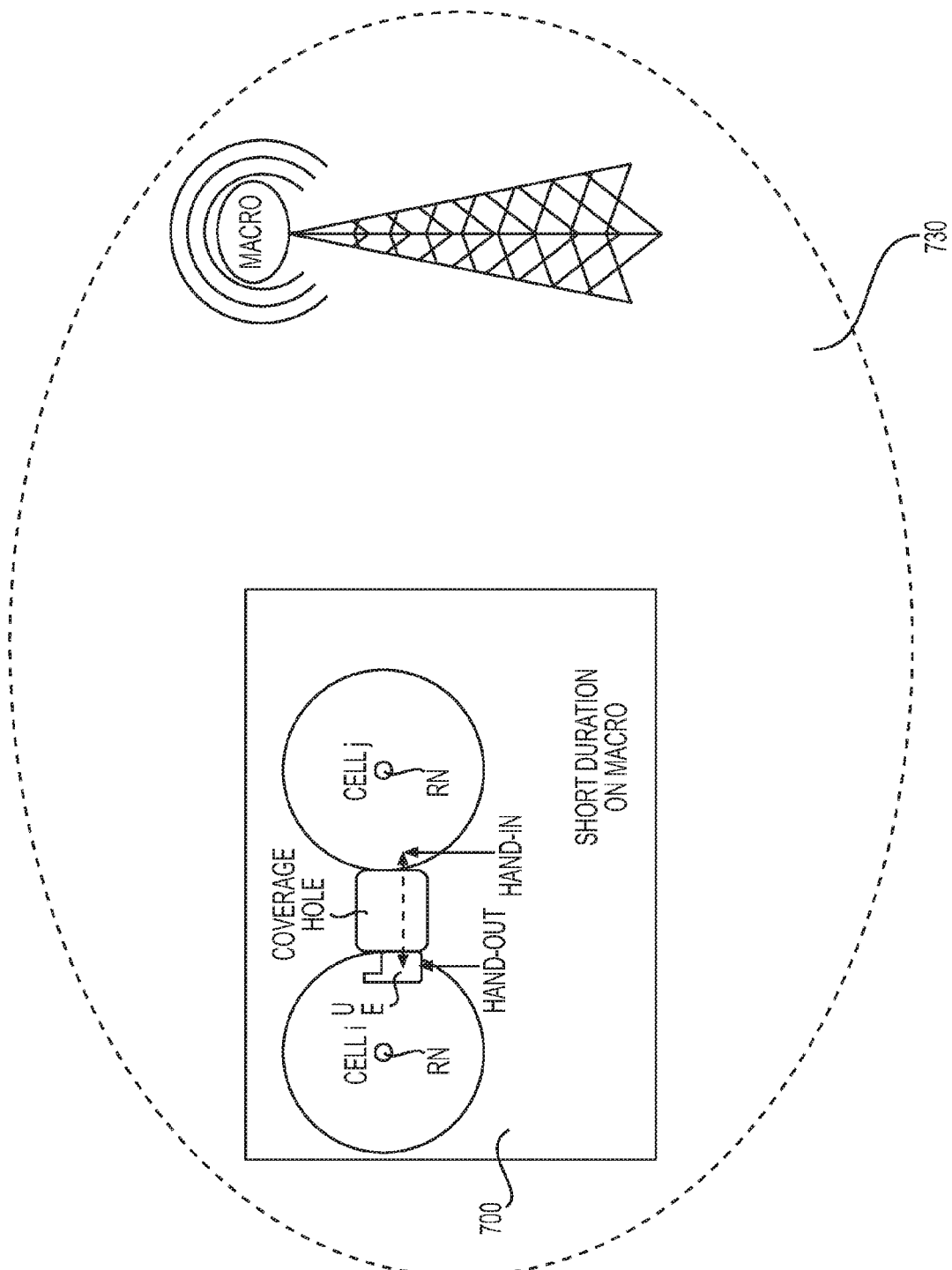
FIG. 6 shows a simplified floorplan that includes adjacent cells i and j that have a coverage hole between their respective coverage areas and an overlapping macrocell.

The second use case, in which there is an overlapping macro cell network that is present in the area where the small cell RAN is installed, will be illustrated with reference to FIG. 6. Similar to the first use case, the techniques employed in this second use case may also apply to small cells (including picocells) and macrocells in a heterogenous network. FIG. 6 shows a coverage area 700 that defines a network that includes adjacent cells i and j that have a coverage hole 710 between their respective coverage areas. For convenience and simplicity of discussion, the network defined by coverage area 700 will be described below as a small cell RAN, but more generally may be any of the network types discussed above. Because there is a macrocell 730 present, there will be a handout event from the small cell RAN to the macro network when a UE leaves cell i and a hand-in event from the macrocell 730 to the small cell RAN when the UE attaches to cell j. No pertinent action is taken on the part of the small cell RAN when the handout event occurs. However, when the hand-in event occurs at cell j the macrocell from which the call is being transferred sends a transfer request to the RN for cell j. This transfer request, which is typically communicated by the eNB 740 of the macrocell 730 over an S1 interface using the S1 Application Protocol (S1AP), contains UE history information, which is a list identifying the cells to which the UE has been connected during the current call and the duration of those connections.

Thus, when a hand-in to cell j occurs, the RN in cell j can examine the UE history information contained in the transfer request and identify those cells in the small cell RAN to which the UE was connected prior to establishing the connection to the macro network. In this way it can be inferred that a coverage hole exists between cell j and the cell to which the UE was connected prior to the transfer to the macrocell. As in the previously discussed use case, the RNs can maintain vector counters whose appropriate entries are incremented each time the UE history information indicates that a coverage hole may exist between two cells. The RN downlink transmit powers can be adjusted to reduce or eliminate the coverage hole after an entry in the counter exceeds a threshold value.

In some implementations, instead of identifying a coverage hole when an entry in the counter exceeds some predefined number of events, a normalized number of events may be used to identify a coverage hole. In particular, in this embodiment a coverage hole is identified when an entry in the counter relative to the total number of handovers between cells associated with that entry exceeds some relative threshold (i.e., a percentage).

In some implementations instead of increasing the downlink power assignments to the RNs, it may be appropriate to reduce the power to certain RNs if the values of counters based on UE history information indicate that the number of call disconnects due to poor coverage relative to the total numbers of handovers is below some predefined configurable threshold. A value for the counter below this threshold would indicate that the transmit powers are higher than necessary to ensure that handout rate to the macro network within the small cell RAN installation is below a desired percentage e.g. 0.1%.

Figure 7:
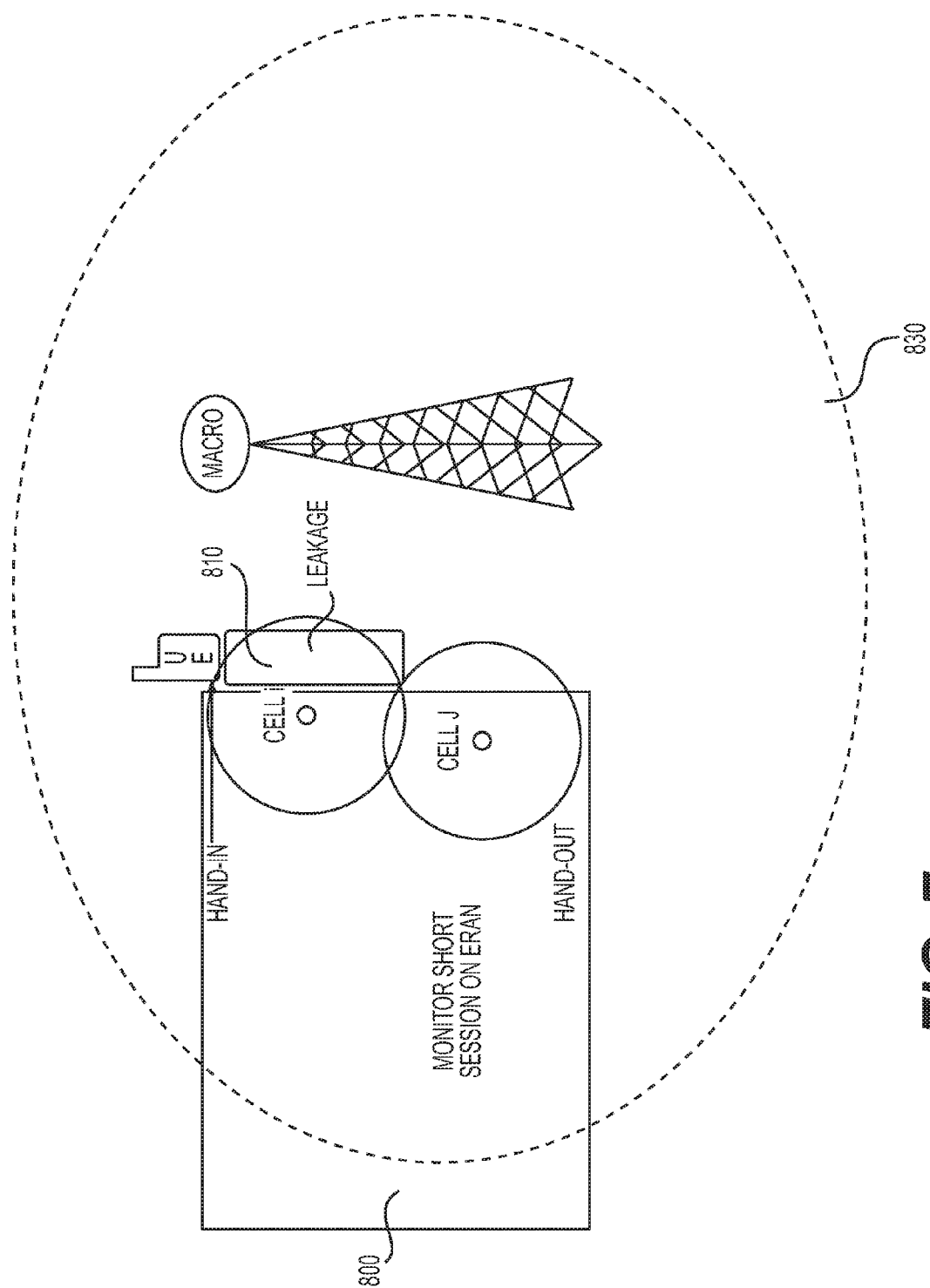
FIG. 7 shows a simplified floorplan that includes adjacent cells i and j having downlink power transmissions that leak or bleedout beyond the designated deployment area of the small cell RAN.

The third use case, in which there is leakage or bleedout of the transmit power from one or more RNs in a small cell RAN or pico network to a location outside of the intended coverage area (e.g., a building), will be illustrated with reference to FIG. 7. FIG. 7 shows a coverage area 800 that includes adjacent cells i and j near the edge of the enterprise, which in this example is a building. As shown leakage of the transmission power from the RN associated with cell i occurs at region 810 immediately outside of the building.

A UE outside of the intended coverage area that approaches the coverage area 800 in FIG. 7 will connect to cell i upon entering the region 810. An event may be defined as starting when the UE attaches to cell i through a hand-in from a macrocell 830 and ending when it disconnects from some cell j (which might even be cell i) via a handout. The start and end time of the event may be stored by the RAN. Such events that are relatively short in duration are likely to be due to a UE that connected to the cell from outside the enterprise through leakage of transmission power from the RN. These events are thus treated as potentially being due to leakage. When the UE undergoes a handout, its history is examined to determine if its connection to the small cell RAN or pico network originated through a hand-in from a macrocell. If the UE did in fact connect through a hand-in from a macro network and the duration of the event is less than some specified value, a counter in the RN where the hand-in occurred will be incremented. Once the value in the counter exceeds a predefined configurable threshold, the RN downlink transmit power of cell i can be reduced to thereby reduce or eliminate the leakage of transmit power.

Several aspects of telecommunication systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on non-transitory computer-readable media. Non-transitory computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable non-transient media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Variations of the above described systems and methods will be understood to one of ordinary skill in the art given this teaching.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of assigning downlink transmit power levels to a plurality of radio nodes (RNs) in a radio access network (RAN) deployed in a defined environment, comprising:
   (a) assigning initial power levels to each of the RNs in the deployed RAN;
   (b) for each cell associated with the RNs, counting a number of first events indicating that UEs receiving a signal from their serving cells with a signal strength below a specified value have entered a coverage hole;
   (c) for each cell associated with the RNs, counting a number of second events indicating that UEs have re-established a previous connection on one of the cells;

(d) for each pair of cells i and j in the RAN, identifying a coverage hole between a cell i and a cell j in the RAN if a number of first events counted for cell i exceeds a threshold level and a number of second events counted for re-establishment of a previous connection on cell j from a disconnect on cell i exceeds another threshold level; and (e) for each of the identified coverage holes, increasing the downlink transmit power level of at least one of the RNs associated with the pair of cells between which the coverage hole has been identified.

2. The method of claim 1, further comprising resetting the counters counting the number of first and second events and repeating steps (b)-(e) after expiration of a specified period of time.

3. The method of claim 1, wherein counting the number of first events includes receiving messages from the UEs indicating that the UEs receiving a signal from their serving cells with a signal strength below the specified value have entered a coverage hole.

4. The method of claim 3, wherein the messages are Radio Resource Control (RRC) Measurement Reports and the first events are A2 triggering events.

5. The method of claim 1, wherein counting the number of second events includes receiving messages from the UEs indicating that the UEs have re-established a previous connection on one of the cells.

6. The method of claim 5, wherein the messages are Radio Resource Control (RRC) Connection Reestablishment Requests.

7. The method of claim 1, wherein the RAN includes an access controller operatively coupled to the RNs, the services node coordinating steps (b)-(e).

8. The method of claim 1, wherein the RAN is selected from the group including a small cell RAN, a macro network or a combination of a small cell RAN and a macro network.

9. The method of claim 1, wherein the threshold levels are based on a preconfigured fraction of a total number of handovers that occur between the cells i and j.

10. A method of assigning downlink transmit power levels to a plurality of radio nodes (RNs) in a RAN deployed in a defined environment, comprising:

(a) assigning initial power levels to each of the RNs in the deployed RAN;

(b) receiving transfer requests from a macro network each requesting a hand-in of a UE from the macro network to one of the cells, each of the transfer requests including UE history information for the UE being handed-in;

(c) for any pair of cells in the RAN, inferring that a coverage hole exists between the pair of cells if the UE history information received by one of the cells in the pair for a given UE indicates that the given UE was connected to the other cell in the pair prior to the transfer of the given UE to the macro cell; and (d) counting a number of received transfer requests from which existence of a coverage hole is inferred between each pair of cells in the RAN and, if the number for a particular pair exceeds a threshold value, adjusting upward the downlink transmit power of at least one of the RNs associated with the cells in the pair.

11. The method of claim 10, wherein the transfer requests conform to the S1 application protocol (S1AP).

12. The method of claim 10, further comprising resetting the number of received transfer requests being counted and repeating steps (b)-(d) after expiration of a specified period of time.

13. The method of claim 10, wherein the RAN includes an access controller operatively coupled to the RNs, the services node coordinating steps (b)-(d).

14. The method of claim 10, wherein the RAN is selected from the group including a small cell RAN, a macro network or a combination of a small cell RAN and a macro network.

15. The method of claim 10, wherein the threshold values are based on a preconfigured fraction of a total number of handovers that occur between the pairs of cells.

16. A method of assigning downlink transmit power levels to a plurality of radio nodes (RNs) in a small cell RAN or pico network deployed in a defined environment, comprising:

(a) assigning initial power levels to each of the RNs in the deployed small cell RAN or pico network;

(b) receiving a transfer request from a macro network requesting a hand-in of a UE from a macro network to one of the cells in the small cell RAN or pico network;

identifying for a hand-in session of the UE a hand-out from one of the cells in the small cell RAN or pico network to the macro network;

identifying an event that starts at a time of the hand-in request from the macro network and ends at a time when the hand-out of the UE to the macro network is identified;

counting the event as arising from leakage of downlink transmission power from the cell where the hand-in occurred to a region outside of the defined environment if a duration of the event is less than a threshold amount of time; and reducing the downlink transmission power assigned to the cell where the hand-in occurred if the number of events counted for the cell during a specified time period exceeds a threshold value.

17. The method of claim 16, wherein the transfer requests conform to the S1 application protocol (S1AP).

18. The method of claim 16, wherein the hand-in is to a first cell in the small cell RAN or pico network and the hand-out is from a second cell in the small cell RAN or pico network that is different from the first cell.

19. The method of claim 16, wherein the hand-in is to, and the hand-out is from, the same cell in the small cell RAN or pico network.

20. A method of assigning downlink transmit power levels to a plurality of radio nodes (RNs) in a radio access network (RAN) deployed in a defined environment, comprising:

(a) assigning initial power levels to each of the RNs in the deployed RAN;

(b) for each cell associated with the RNs, counting a number of first events indicating that UEs are receiving a signal from their serving cells with a signal strength below a specified value;

(c) for each cell associated with the RNs, counting a number of second events indicating that UEs have re-established a previous connection on one of the cells;

(d) for each pair of cells i and j in the RAN, if a number of first events counted for cell i is below a threshold level and a number of second events counted for re-establishment of a previous connection on cell j from a disconnect on cell i is below another threshold level, decreasing the downlink transmit power level of at least one of the RNs associated with the pair of cells i and j.

21. A method of assigning downlink transmit power levels to a plurality of radio nodes (RNs) in a RAN deployed in a defined environment, comprising:

(a) assigning initial power levels to each of the RNs in the deployed RAN;
(b) receiving transfer requests from a macro network each requesting a hand-in of a UE from the macro network to one of the cells, each of the transfer requests including UE history information for the UE being handed-in;
(c) for any pair of cells in the RAN, counting a number of events that arise between the pair of cells when the UE history information received by one of the cells in the pair for a given UE indicates that the given UE was connected to the other cell in the pair prior to the transfer of the given UE to the macro cell; and
(d) if the number of events for a particular pair is below a threshold value, adjusting downward the downlink transmit power of at least one of the RNs associated with the cells in the pair.

* * * * *